United States Patent
Schaper

(10) Patent No.: US 6,639,193 B2
(45) Date of Patent: Oct. 28, 2003

(54) METHOD AND APPARATUS FOR THE END-SURFACE CONNECTION OF A CARRIER MATRIX OF A HONEYCOMB BODY BY A JOINING TECHNIQUE

(75) Inventor: Katrin Schaper, Siegburg (DE)

(73) Assignee: Emitec Gesellschaft für Emissionstechnologie mbH, Lohmar (DE)

( * ) Notice: Subject to any disclaimer, the term of this patent is extended or adjusted under 35 U.S.C. 154(b) by 26 days.

(21) Appl. No.: 10/097,491

(22) Filed: Mar. 14, 2002

(65) Prior Publication Data

US 2002/0116816 A1 Aug. 29, 2002

Related U.S. Application Data

(63) Continuation of application No. PCT/EP00/08596, filed on Sep. 1, 2000.

(30) Foreign Application Priority Data

Sep. 14, 1999 (DE) .......................................... 199 43 976

(51) Int. Cl.⁷ ................................................. H05B 6/10
(52) U.S. Cl. ....................................... 219/603; 219/635
(58) Field of Search ................................. 219/603, 633, 219/634, 635, 615, 652, 675; 156/272.2

(56) References Cited

U.S. PATENT DOCUMENTS

| 4,484,048 A | 11/1984 | Travers et al. |
| 4,923,109 A | 5/1990 | Cyron |
| 5,657,923 A | 8/1997 | Sheller |
| 5,785,931 A | 7/1998 | Maus et al. |
| 5,877,107 A | 3/1999 | Zahn et al. |

FOREIGN PATENT DOCUMENTS

| EP | 0 245 737 A1 | 11/1987 |
| GB | 2 111 360 A | 6/1983 |
| JP | 05057198 | * 3/1993 |
| JP | 08 112 668 | 5/1996 |

OTHER PUBLICATIONS

Que Han: "Principles of Electric Technology", Bai Li Book Publishing, Inc., 1998, pp. 3–3 to 3–7.

* cited by examiner

Primary Examiner—Quang T. Van
(74) Attorney, Agent, or Firm—Laurence A. Greenberg; Werner H. Stemer; Gregory L. Mayback

(57) ABSTRACT

A method and an apparatus produce a connection of at least at one end surface of a carrier matrix of a honeycomb body, in particular a catalyst carrier body, by a joining technique. The matrix is disposed in a tubular jacket and is laminated and/or wound from at least partially structured sheet metal foils or layers. The end surface of the honeycomb body is at least partially heated up with the aid of a surface inductor having induction coils. The induction coils are disposed in such a way that interconnections of the sheet metal foils or layers are established at least at locations, in particular at spots. Such connecting spots are preferably established variably with regard to their extent over the end surface. The surface inductor is variable with regard to the production of connecting locations and/or connecting spots, that is with regard to effective regions. The invention is suitable in particular for connections made by joining techniques such as brazing or sintering and can be applied while the process of producing catalyst carrier bodies is in progress.

23 Claims, 2 Drawing Sheets

METHOD AND APPARATUS FOR THE END-SURFACE CONNECTION OF A CARRIER MATRIX OF A HONEYCOMB BODY BY A JOINING TECHNIQUE

CROSS-REFERENCE TO RELATED APPLICATION

This application is a continuation of copending International Application No. PCT/EP00/08596, filed Sep. 1, 2000, which designated the United States.

BACKGROUND OF THE INVENTION

FIELD OF THE INVENTION

The present invention relates to a method for the end-surface connection of a carrier matrix of a honeycomb body, in particular a catalyst carrier body, through the use of a joining technique. The matrix is disposed in a tubular jacket and is laminated and/or wound from at least partially structured sheet metal foils or layers. The invention also relates to an apparatus, in particular for carrying out the method.

Known honeycomb bodies, in particular metallic catalyst carrier bodies, include a carrier matrix with, for example, spirally wound, very thin-walled, smooth and/or corrugated sheet metal foils or layers. The layers are interconnected in a circular-cylindrical or oval-cylindrical tubular jacket through the use of a joining technique, by welding, brazing, sintering, adhesive bonding or the like.

In order to increase the resistance of such a honeycomb body to thermal alternating loads, it is already known to connect the sheets of the carrier matrix to one another, and if appropriate to the tubular jacket, through the use of a joining technique, only in certain subregions, for example at end surfaces. That is done so that under thermal loading there are possibilities for the tubular jacket and the carrier matrix to expand unhindered, thereby avoiding plastic deformations of matrix cells under alternating load, with the consequences of delamination and destruction of the carrier matrix.

Classic methods for the end-surface connection of a carrier matrix of a honeycomb body, in particular a catalyst carrier body, through the use of a joining technique, wherein the matrix is disposed in a tubular jacket and is laminated and/or wound from at least partially structured sheet metal fails or layers, are nowadays carried out in particular in a discontinuous process, lasting several hours, in a high-temperature oven. In that case, the individual honeycomb bodies are loaded into the oven by being collected together in batches. In order to avoid chemical reactions, such as undesired crystal formation or oxidation, in particular on the surface of the sheet metal foils or layers, the joining process takes place in an oven under an inert gas atmosphere, for example containing argon and/or hydrogen, or in a vacuum. Consequently, the joining process in particular entails quite high expenditures for apparatus and corresponding costs.

SUMMARY OF THE INVENTION

It is accordingly an object of the invention to provide a method and an apparatus for the end-surface connection of a carrier matrix of a honeycomb body by a joining technique, which overcome the hereinafore-mentioned disadvantages of the heretofore-known methods and apparatuses of this general type in which, in particular, the method is significantly shortened, the carrier matrix is a catalyst carrier body and the matrix is disposed in a tubular jacket and is laminated and/or wound from at least partially structured sheet metal foils or layers.

With the foregoing and other objects in view there is provided, in accordance with the invention, a method for the end-surface connection of a carrier matrix of a honeycomb body, in particular a catalyst carrier body, by a joining technique. The method comprises providing the honeycomb body with at least one end surface and providing the carrier matrix with laminated and/or wound at least partially structured sheet metal layers disposed in a tubular jacket. The at least one end surface of the honeycomb body is at least partially heated with a surface inductor having appropriately disposed induction coils, to produce interconnections of the sheet metal layers at least at locations, in particular at spots. At least one of the surface inductor and the honeycomb body are moved relative to each other during the heating step, in particular by rotating.

With the objects of the invention in view, there is also provided, in combination with a honeycomb body, in particular a catalyst carrier body, including at least one end surface and a carrier matrix disposed in a tubular jacket and having laminated and/or wound at least partially structured sheet metal layers, an apparatus for carrying out an end-surface connection of the carrier matrix by a joining technique. The apparatus comprises a surface inductor having induction coils. The induction coils at least partially heat the at least one end surface to produce interconnections of the sheet metal layers at least at locations, in particular at spots.

As is mentioned, for example, in European Patent Application 0 245 737 A1, corresponding to U.S. Pat. Nos. 4,832,998; 4,803,189; 4,946,822; and 4,923,109, the use of inductive measures for at least partial connection of a laminated and/or wound carrier matrix of a honeycomb body through the use of a joining technique, has previously scarcely been considered.

That is because it was assumed that, in contrast with the tubular jacket, the honeycomb structure taken as a whole could only be very poorly heated up and brought to a high enough temperature for connection by a joining technique, both through the use of induction coils and by thermal irradiation from outside.

However, the present invention surprisingly makes it possible in an advantageous way for at least one end surface of the carrier matrix of a honeycomb body to be connected by a joining technique in a matter of seconds. In general, it is possible in this case to dispense with inertizing measures, since chemical reactions do not occur for a sustained period of time, at least insofar as slowly proceeding equilibrium reactions are concerned, due to the extremely reduced connecting time.

In accordance with another mode of the invention, for application of the invention in the production of particularly flexible catalyst carrier bodies, it is proposed that the connecting locations on the end surface of the honeycomb body preferably be established in a locally selective way and/or variably with regard to their extent on the end surface. A surface inductor which is variable in an advantageous way with regard to the production of connecting locations and/or connecting spots, that is with regard to its effective regions, is proposed for this purpose.

In accordance with a further mode of the invention, the invention may be combined with possibly already existing inductive apparatuses for the at least partial connection of the ends of sheet metal foils or layers to a tubular jacket, especially through the use of a joining technique. Therefore, it is proposed, for example, to construct the induction coils in such a way that the end surfaces of the honeycomb body are heated up in such a manner that no connections of the sheet metal foils or layers to the tubular jacket are established.

In accordance with an added mode of the invention, an alternative embodiment thereto provides, for example, for constructing the induction coils at least partially in such a way that the end surface of the honeycomb body is heated up in such a manner that connections of the sheet metal foils or layers to the tubular jacket are established at the same time.

In accordance with an additional mode of the invention, the induction coils are constructed in such a way that essentially the entire end surface of the carrier matrix of the honeycomb body can be heated up, in particular uniformly.

In accordance with yet another mode of the invention, this can also be achieved and/or supported, for example, by moving, in particular rotating, the surface inductor and/or the honeycomb body relative to each other.

In accordance with yet a further mode of the invention, as an alternative or in addition thereto, the surface inductor may also be appropriately constructed, for example with segmented induction coils or as a so-called spiral inductor.

Tests have shown that the induction coils of an apparatus according to the invention do not have to be operated with a high AC voltage frequency of approximately 3 MHz, as may be expected on the basis of theoretical considerations. On the contrary, in accordance with yet an added mode of the invention, a much lower AC voltage frequency of approximately 138 to 170 kHz, in particular approximately 140 to 160 kHz, preferably approximately 150 kHz, is already adequate to introduce sufficient energy into the sheet metal foils or layers to be able to establish the connection through the use of a joining technique as is described below, for example.

In accordance with yet an additional mode of the invention, the method is suitable, in particular, for connections made by joining techniques such as brazing or sintering. The joining techniques can be applied in an advantageous way while the process of producing catalyst carrier bodies is in progress, without exceeding the short cycle times for the remaining production steps for the connecting operation.

Finally, it should also be mentioned that not only can the features described above be combined with one another but they can also be combined with known types of connections produced through the use of joining techniques. In particular, in accordance with a concomitant mode of the invention, the advantages of the present invention can be combined with the advantages of the production of catalyst carrier bodies under an inert gas atmosphere or some other defined atmosphere for surface treatment, in that the honeycomb body is kept entirely or partly under inert gas during the connecting operation.

Other features which are considered as characteristic for the invention are set forth in the appended claims.

Although the invention is illustrated and described herein as embodied in a method and an apparatus for the end-surface connection of a carrier matrix of a honeycomb body by a joining technique, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
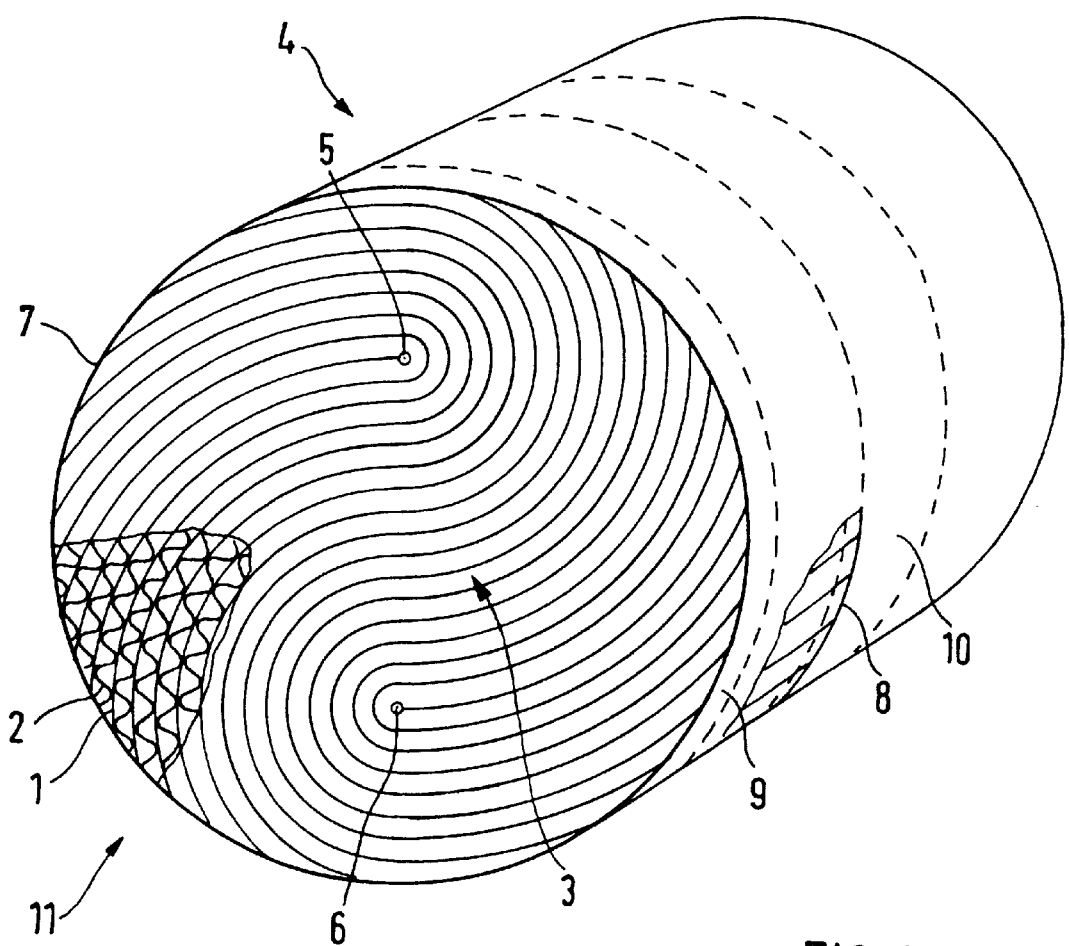
FIG. 1 is a diagrammatic, partly broken-away, perspective view of a catalyst carrier body produced by intertwining or intertwisting in opposite directions.

Referring now in detail to the figures of the drawings and first, particularly, to FIG. 1 thereof, there is seen a carrier matrix 3 of a honeycomb body 4, in particular a catalyst carrier body. In the exemplary embodiment, the matrix is laminated and wound from alternating layers of smooth sheet metal foils or layers 1 and structured, for example corrugated, sheet metal foils or layers 2 and intertwined in opposite directions about two fixed points 5, 6. The sheet metal foils or layers 1, 2 which are intertwined in this way are disposed in a tubular jacket 7 and are only to be connected to one another and possibly to the tubular jacket 7 by a joining technique in narrow connecting regions 9, for example at end surfaces. Possibilities for largely unhindered expansion under thermal loading should exist for the tubular jacket 7 and the carrier matrix 3. However, the connection of the sheet metal foils or layers 1, 2 to the tubular jacket 7 may also take place in a separate narrow connecting region 10 which is, for example, disposed centrally with respect to the honeycomb body 4. In this way, improved unhindered expansion for the carrier matrix 3 and the tubular jacket 7 is made possible for an end surface 11 of the honeycomb body 4 that is subjected first to hot exhaust gas. In order to improve the stability there, the individual sheet metal foils or layers 1, 2 may not only be connected by a joining technique to the tubular jacket 7 but also additionally to one another in a preferably annular outer-zone region 8. In this way, a stable structure is produced even if individual layers do not touch the tubular jacket due to deviations in length. In principle, the tubular jacket which has a circular-cylindrical construction according to the exemplary embodiment may also have a different form, in particular an oval-cylindrical construction, and/or include a plurality of segments.

Figure 2:
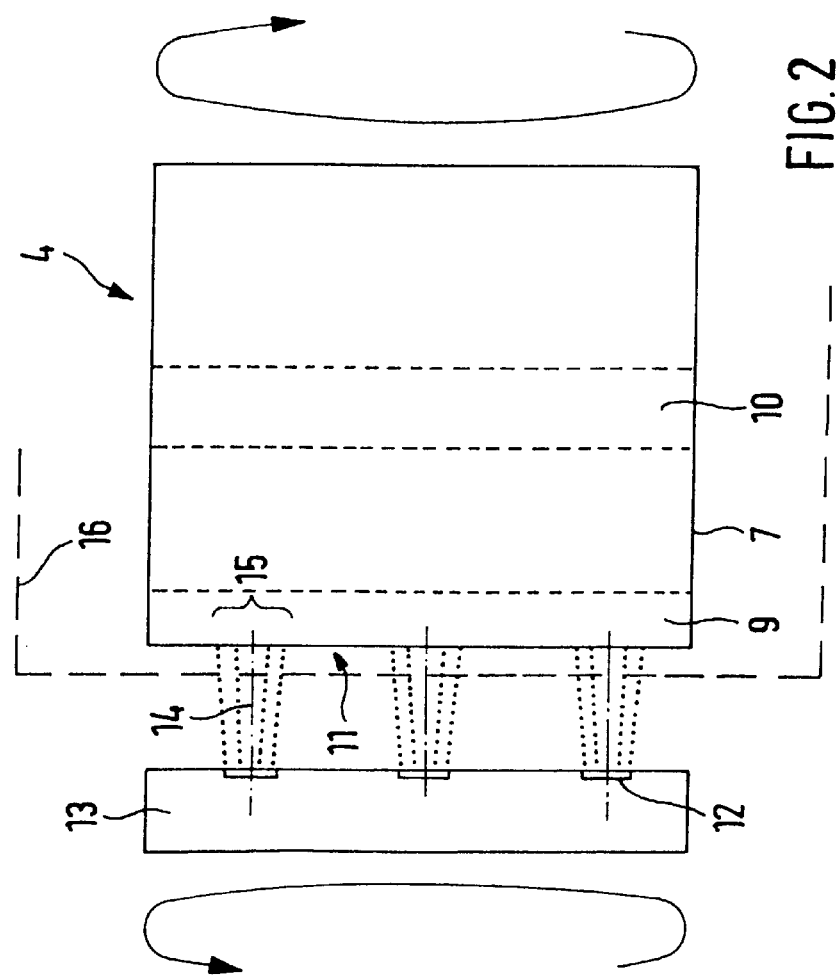
FIG. 2 is a side-elevational view of the catalyst carrier body according to FIG. 1 with a surface inductor.
Figure 3:
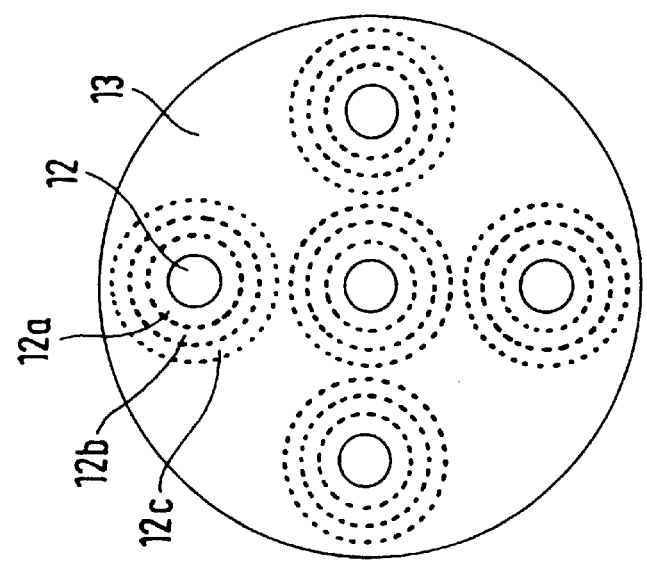
FIG. 3 is a front-elevational view of the surface inductor according to FIG. 2.

FIGS. 2 and 3 diagrammatically show the carrier matrix 3 of the honeycomb body 4, in particular the catalyst carrier body, disposed in the tubular jacket 7 and laminated and/or wound from the at least partially structured sheet metal foils or layers 1, 2. According to the invention, the connection at the end surface 11 of the carrier matrix 3 by the joining technique takes place by at least partially heating up the end surface 11 of the honeycomb body 4 with the aid of a surface inductor 13. The surface inductor 13 includes induction coils 12 which are appropriately disposed in such a way that connections of the sheet metal foils or layers 1, 2 to one another are established at least at locations 14, in particular at spots 15.

In order to ensure a range of applications for the invention that is as wide as possible, in particular the production of a wide variety of catalyst carrier bodies, the connecting locations 14 on the end surface 11 of the honeycomb body 4 can preferably be established in a locally selective way. It is preferred for each connecting location 14 to be in the form of a spot, that is to extend over a surface area. Such connecting spots 15 can preferably be established variably with regard to their extent over the end surface. For this purpose, a surface inductor 13 is proposed which is variable in an advantageous way with regard to the production of the connecting locations 14 and/or connecting spots 15, that is with regard to its effective regions 14, 15. This can be achieved, for example, through the use of further induction coil segments 12a, 12b, 12c, which are diagrammatically represented in FIG. 3 and can be activated according to the desired size of the connecting spots 15 to be established. It is particularly advantageous if the surface inductor as a whole has a segmental construction, to allow connections to be established at any location on the end surface of the honeycomb body and extend over any desired surface area.

The induction coils 12 of the surface inductor 13 according to the exemplary embodiment are preferably constructed so as to ensure that the end surface 11 of the honeycomb body 4 is heated up in such a way that the sheet metal foils or layers 1, 2 are not connected to the tubular jacket 7. In other words, the heating is carried out without establishing connections of the sheet metal foils or layers 1, 2 with respect to the tubular jacket 7. This allows an advantageous connection of the ends of the sheet metal foils or layers 1, 2 through the use of a joining technique to the tubular jacket 7 at some other location than on the end surface 11 of the honeycomb body 4, in particular in the central connecting region 10 of the honeycomb body 4, with the advantage of possibilities of undisturbed expansion. It is possible, in particular, for the connection of the ends of the sheet metal foils or layers 1, 2 to the tubular jacket 7 to take place again by inductive measures or in some other way.

If the ends of the sheet metal foils or layers are indeed to be end-surface connected to the tubular jacket, the end surface of the honeycomb body can be heated up in such a way that connections of the sheet metal foils or layers to the tubular jacket can be established at the same time if the induction coils of the surface inductor at least partially have an appropriate shape. Surface inductors which at least partially have induction coils at the edge with a higher AC voltage frequency than in the remaining region are preferred.

In particular, in the case of honeycomb bodies 4 with separate connecting regions 9 and 10, it is proposed to improve the end-surface stability of the carrier matrix 3 of the honeycomb body 4 by preferably constructing the induction coils 12 in such a way that substantially the entire end surface 11 of the carrier matrix 3 of the honeycomb body 4 can be heated up, in particular uniformly. This aim can also be achieved and/or supported, for example, by the surface inductor 13 and/or the honeycomb body 4 being moved in relation to each other, in particular rotated, which is symbolized in FIG. 2 by arrows.

As an alternative or in addition to this, the surface inductor may also be appropriately constructed, for example as a spiral inductor, in addition to the already mentioned segmented construction of the induction coils.

Tests have shown that the induction coils 12 of an apparatus according to the invention do not have to be operated with a high AC voltage frequency of approximately 3 MHz, as is the case, for example, with known inductively operated apparatuses for connecting the ends of sheet metal foils or layers to a tubular jacket through the use of a joining technique. On the contrary, in an advantageous way a much lower AC voltage frequency of approximately 130 to 170 kHz, in particular approximately 140 to 160 kHz, preferably approximately 150 kHz, is already adequate to introduce sufficient energy into the sheet metal foils or layers 1, 2 or the carrier matrix 3 to be able to establish the desired connecting locations 14 or connecting spots 15.

Finally, it should also be pointed out that, unlike that which is diagrammatically represented in FIG. 2, the surface inductor 13 is in reality not disposed so far away from the end surface 11 of the honeycomb body 4, but rather it is directly alongside it. As is diagrammatically indicated in FIG. 2, the honeycomb body 4 or the entire apparatus may also be disposed in a housing 16, so that an inert gas atmosphere can be established during the heating.

The present invention is suitable in particular for connections made by joining techniques such as brazing or sintering which can be applied in an advantageous manner while the process of producing catalyst carrier bodies is in progress.

I claim:

1. A method for the end-surface connection of a carrier matrix of a honeycomb body by a joining technique, which comprises:

providing the honeycomb body with at least one end surface;

providing the carrier matrix with at least one of laminated and wound at least partially structured sheet metal layers disposed in a tubular jacket;

at least partially heating the at least one end surface of the honeycomb body with a surface inductor having induction coils, to produce interconnections of the sheet metal layers at least at locations and to establish the interconnections at any location on the end surface; and moving at least one of the surface inductor and the honeycomb body relative to each other during the heating step.

2. The method according to claim 1, wherein the honeycomb body is a catalyst carrier body.

3. The method according to claim 1, wherein the locations are spots.

4. The method according to claim 3, which further comprises establishing the connecting locations on the end surface of the honeycomb body in a locally selective manner and variably with regard to their extent over the spots.

5. The method according to claim 3, which further comprises establishing the connecting locations on the end surface of the honeycomb body in a locally selective manner with regard to their extent over the spots.

6. The method according to claim 3, which further comprises establishing the connecting locations on the end surface of the honeycomb body variably with regard to their extent over the spots.

7. The method according to claim 1, which further comprises carrying out the moving step by rotating.

8. The method according to claim 1, which further comprises carrying out the heating step by heating the at least one end surface of the honeycomb body spatially while avoiding connections between the sheet metal layers and the tubular jacket.

9. The method according to claim 1, which further comprises carrying out the heating step by heating the at least one end surface of the honeycomb body while at the same time establishing connections between the sheet metal layers and the tubular jacket.

10. The method according to claim 1, which further comprises carrying out the heating step by entirely heating the at least one end surface of the honeycomb body.

11. The method according to claim 1, which further comprises carrying out the heating step by entirely and approximately uniformly heating the at least one end surface of the honeycomb body.

12. The method according to claim 1, which further comprises operating the induction coils with an AC voltage having a frequency of approximately 130 to 170 kHz.

13. The method according to claim 1, which further comprises operating the induction coils with an AC voltage having a frequency of approximately 140 to 160 kHz.

14. The method according to claim 1, which further comprises operating the induction coils with an AC voltage having a frequency of approximately 150 kHz.

15. The method according to claim 1, which further comprises producing the connection by a joining technique selected from the group consisting of brazing and sintering.

16. The method according to claim 1, which further comprises maintaining at least regions of the honeycomb body to be heated under an inert gas while producing the connection by a joining technique.

17. In combination with a honeycomb body including at least one end surface and a carrier matrix disposed in a tubular jacket and having at least one of laminated and wound at least partially structured sheet metal layers, an apparatus for carrying out an end-surface connection of the carrier matrix by a joining technique, the apparatus comprising:

a surface inductor having induction coils, said induction coils at least partially heating the at least one end surface to produce interconnections of the sheet metal layers at least at locations, and said surface inductor having a segmental construction to allow the interconnections to be established at any location on the end surface.

18. The apparatus according to claim 17, wherein the honeycomb body is a catalyst carrier body.

19. The apparatus according to claim 17, wherein the locations are spots.

20. The apparatus according to claim 19, wherein said surface inductor is adjustable with regard to said spots.

21. The apparatus according to claim 17, wherein said surface inductor is adjustable with regard to said locations.

22. The apparatus according to claim 17, which further comprises a device for maintaining the honeycomb body at least partially under inert gas while producing the connection by the joining technique.

23. The apparatus according to claim 22, wherein said device is an electrically non-conducting housing.

* * * * *